United States Patent [19]
Haugen

[11] Patent Number: 5,425,427
[45] Date of Patent: Jun. 20, 1995

[54] FOLDING MARKER FOR AGRICULTURAL IMPLEMENT

[75] Inventor: Oliver Haugen, Mayville, N. Dak.

[73] Assignee: Poma Industries, Inc., Mayville, N. Dak.

[21] Appl. No.: 182,272

[22] Filed: Jan. 13, 1994

[51] Int. Cl.⁶ ............................................. A01B 25/00
[52] U.S. Cl. .................................... 172/126; 239/166; 212/262; 212/239
[58] Field of Search ................................. 172/126–132, 172/311, 456; 111/25, 27, 28, 33; 239/165, 166; 212/262, 239

[56] References Cited

U.S. PATENT DOCUMENTS

| | | |
|---|---|---|
| 497,339 | 5/1893 | Peters . |
| 1,021,021 | 3/1912 | Vibbert . |
| 2,178,124 | 10/1939 | Robinson ............................ 172/128 |
| 2,341,146 | 2/1944 | Kriegbaum et al. ................ 172/127 |
| 2,483,011 | 9/1949 | Hudson . |
| 3,028,678 | 4/1962 | Bakehouse . |
| 3,503,451 | 3/1970 | Eastman . |
| 3,670,823 | 6/1972 | Matthews et al. ................... 172/130 |
| 3,747,148 | 7/1973 | Hitchcock . |
| 3,762,482 | 10/1973 | Johnson . |
| 3,766,987 | 10/1973 | Orthman . |
| 4,044,952 | 8/1977 | Williams et al. .................... 239/165 |
| 4,049,062 | 9/1977 | Rossmiller et al. . |
| 4,203,266 | 5/1980 | Hasquenoph . |
| 4,207,950 | 6/1980 | Kinzenbaw ......................... 172/126 |
| 4,360,066 | 11/1982 | Mann .................................. 172/130 |
| 4,365,672 | 12/1982 | Robinson, Jr. et al. ............. 172/130 |
| 4,526,235 | 7/1985 | Kinzenbaw . |
| 4,530,405 | 7/1985 | White . |
| 4,674,578 | 7/1987 | Bexten et al. . |
| 4,880,160 | 11/1989 | Patterson et al. . |
| 5,027,525 | 7/1991 | Haukaas . |

*Primary Examiner*—Dennis L. Taylor
*Assistant Examiner*—Spencer Warnick
*Attorney, Agent, or Firm*—Schwegman, Lundberg & Woessner

[57] ABSTRACT

An improved folding marker for an agricultural implement that is partially self-supporting in the use position and during a portion of the folding operation. An inner arm is pivotally attached to the agricultural implement for simultaneous movement in both the horizonal and vertical directions. A caster wheel is attached to the inner arm to support the inner arm above the ground. An outer arm is pivotally attached to the inner arm for movement in a generally vertical direction. A marker device is attached to the outer arm for scoring the ground. An actuator is attached to the implement and the back portion of the inner arm for moving the inner arm between the use position and backwards toward the rear of the implement to a transport position. A series of pulley systems are attached to the marker so that the inner and outer arms raise vertically upward when the inner arm is moved from the use position to the transport position, and vice versa.

22 Claims, 3 Drawing Sheets

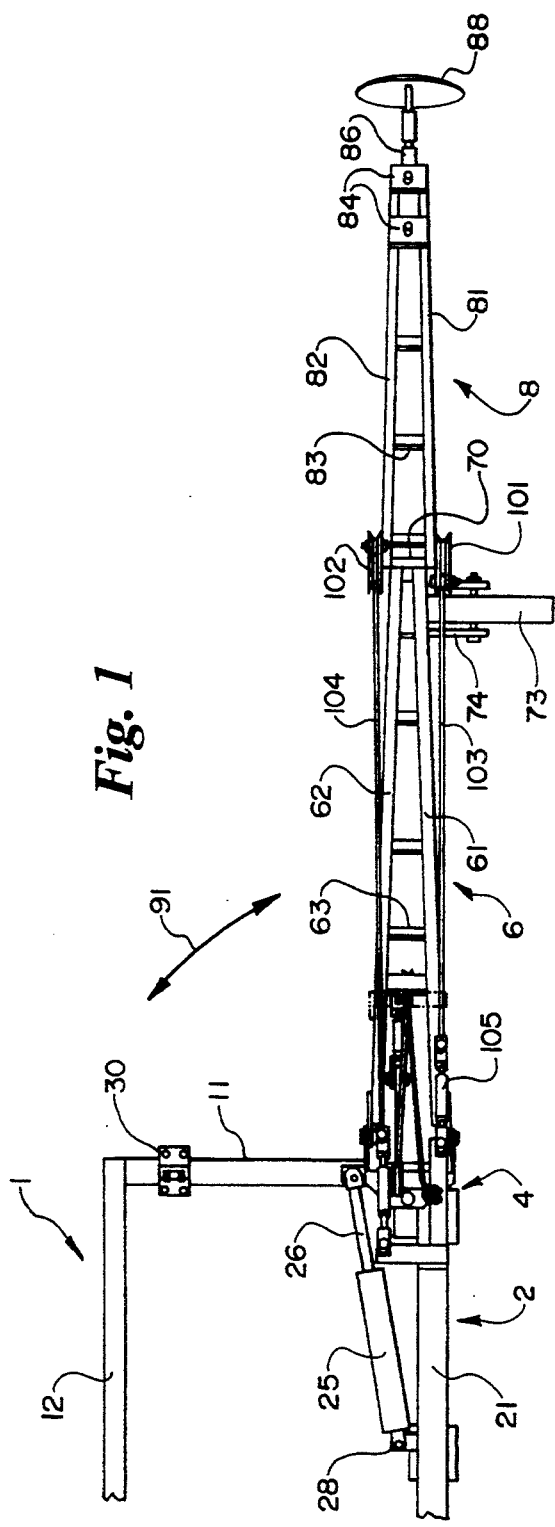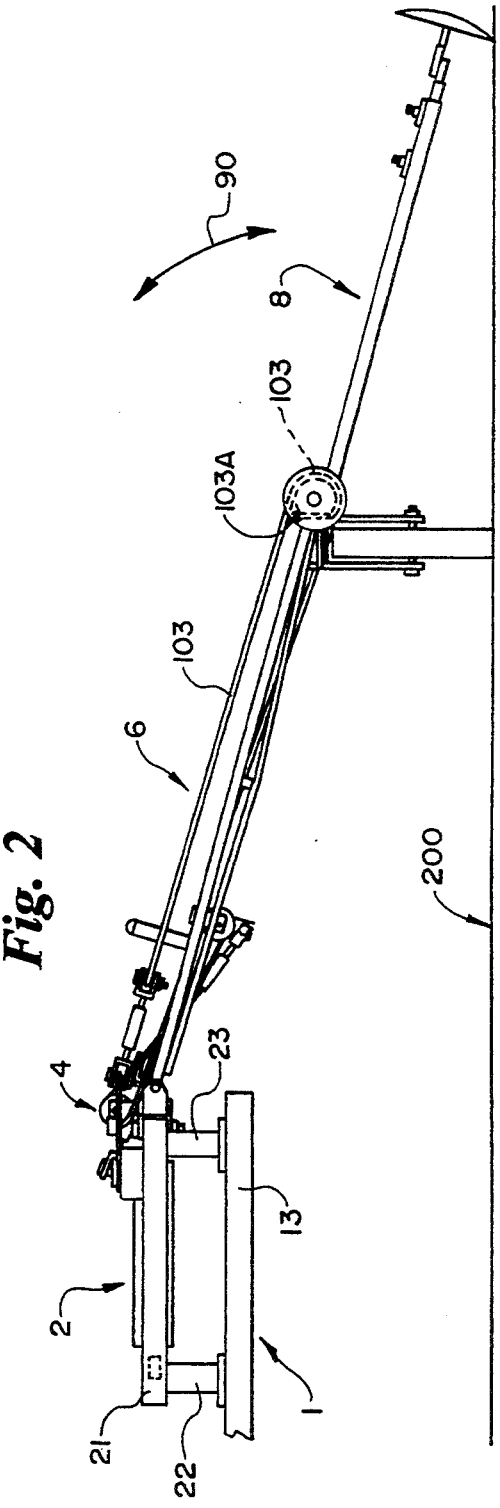

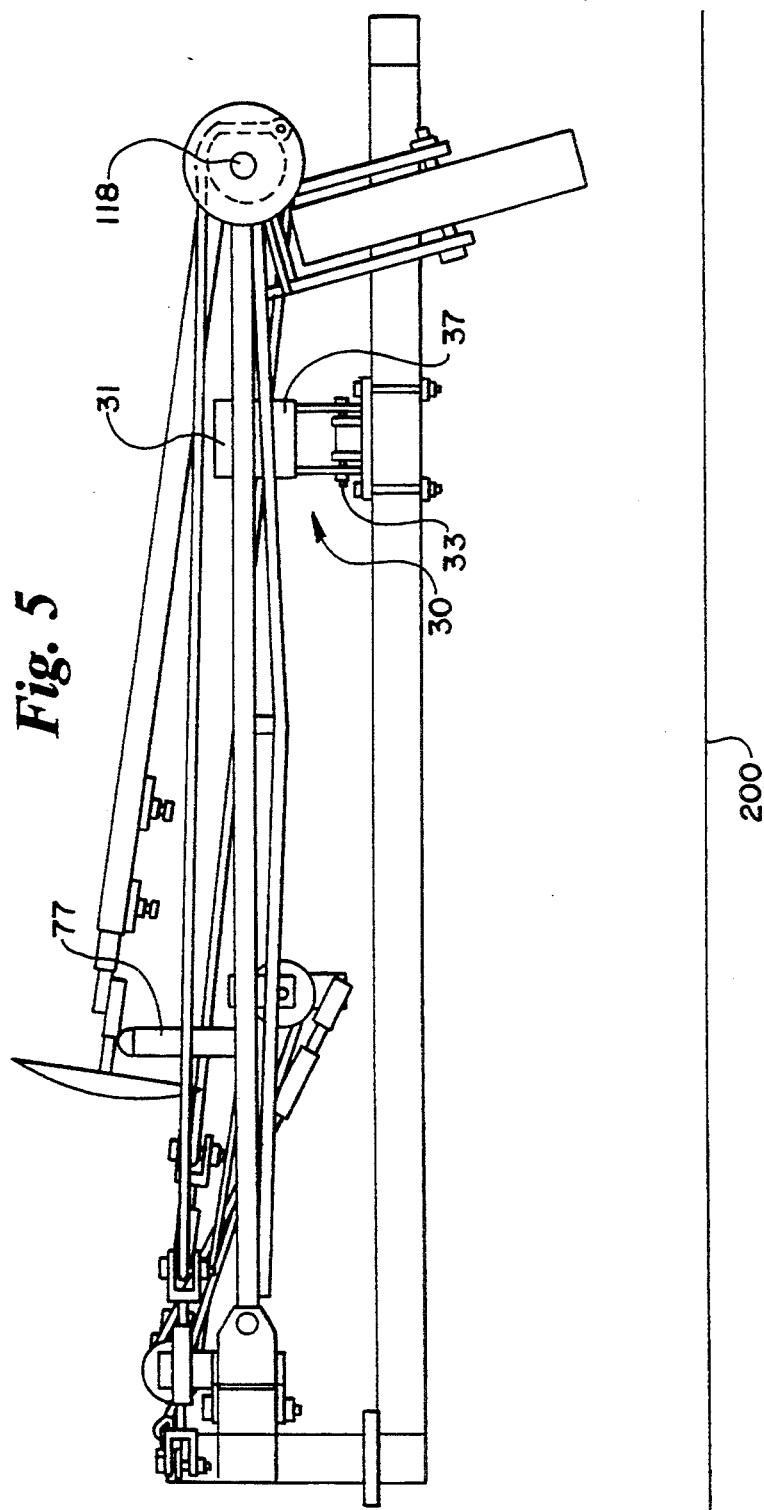

FOLDING MARKER FOR AGRICULTURAL IMPLEMENT

FIELD OF THE INVENTION

This invention pertains to the field of folding markers which are adapted to be attached to the outer edges of agricultural implements, to make a guide mark in the ground to serve as a reference for successive passes of the implement over the ground. In particular, the invention pertains to an improved folding marker which folds automatically and very compactly alongside an outer edge of an implement. The invention is particularly suitable for use on very wide doubly-articulated folding planters, so as not to interfere with the folding of the planter, and so that a pair of markers on opposite sides of the implement do not interfere with one another when the implement is folded to the transport position.

BACKGROUND OF THE INVENTION

Markers are often mounted to the outside edges of agricultural implements for forming marked lines in the ground parallel to the direction of travel of the implement. The marked line then serves as a reference for a subsequent pass of the implement. In the typical example of a tractor-drawn planter, while the planter is planting a number of rows of seed during one pass across a field, a marker attached on a structure extending laterally outward from the side or edge of the planter makes a furrow or a mark along the field parallel to the direction of travel and laterally spaced from the planter. The length of the marker is related to the width of the planter, such that on the next pass of the planter across the field, the marker serves as a guide for alignment of the tractor so that the planted rows are continuous and properly spaced, that is, with no overlap or "underlap" of the planted rows. Because the tractor-drawn planter can turn either to the left or to the right for the next succeeding pass across the field, markers are generally provided on both sides of the planter implement, and some sort of retraction means, preferably automatic or power-operated, is needed so that the marker on one side of the implement can be lifted or retracted while the one on the other side is making the mark that will be used on the next pass. Retraction is necessary not only for clearance while turning, but also when transporting the implement to and from the field.

Markers of the general type thus far described have been widely used and are generally available for attachment to a wide variety of implements. With the increasing popularity of very wide planters having foldable "wings" or outer sections, care must be taken in the design of a marker so that it folds into a form compact enough not to interfere with the folding movement of the planter, or with its companion marker on the opposite side of the planter, when the planter is folded to its transport position. Such considerations become even more important in the case of very wide implements having doubly articulated outboard sections, wherein the outboard sections fold up, then adjacent inboard sections fold up, bringing the original outboard sections to horizontal positions inboard and over the main part of the implement. Obviously, markers intended for use on such implements must fold to a sufficiently compact position as to not interfere with such, double folding action.

It is also important that the marker be strong enough, and properly supported, so as not to put undue strain or tipping force on the outer edge of the planter during use or folding operations. Some prior art markers intended for such operations have attempted to use special hinge designs for attachment of the marker to the implement, wherein all the support, folding and stabilization of the marker, both during use and folded positions, is controlled by the hinge. While such approaches have been successful to some degree, it is believed that such an approach can result in placing too much force at the point of attachment at the outside edge of the planter. This is particularly true in the case of very wide planters, which require correspondingly long markers. The folding forces applied in such designs can actually rock or tilt the planter, which is of course undesirable. On the other hand, the use of a caster or support wheel partway out on the marker beam, which is used in many types of markers, does present problems in terms of compact folding for use on multiple-articulated folding planter implements.

SUMMARY OF THE INVENTION

To solve these and other problems, the present invention provides an improved folding marker for an agricultural implement which is easily attached to the implement, which is partially self-supporting in the use position and during a portion of the folding operation so as not to place excessive forces or rocking or tilting to the implement, even in the case of very long versions of the marker, and which folds automatically under hydraulic control to a compact position adjacent the inside edge of the implement so as not to interfere with the folding of singly- or doubly-articulated planter implements.

BRIEF DESCRIPTION OF THE DRAWINGS

FIG. 1 is a top view of a marker according to the preferred embodiment of the present invention, attached to the outer edge of an implement, a portion of which is shown in the drawing;

FIG. 2 is a side view of the marker of FIG. 1;

FIG. 5 is a side view showing the marker of FIG. 1 in folded position, along the outer edge of an implement to which it is attached.

DETAILED DESCRIPTION OF THE PREFERRED EMBODIMENT

Figure 3:
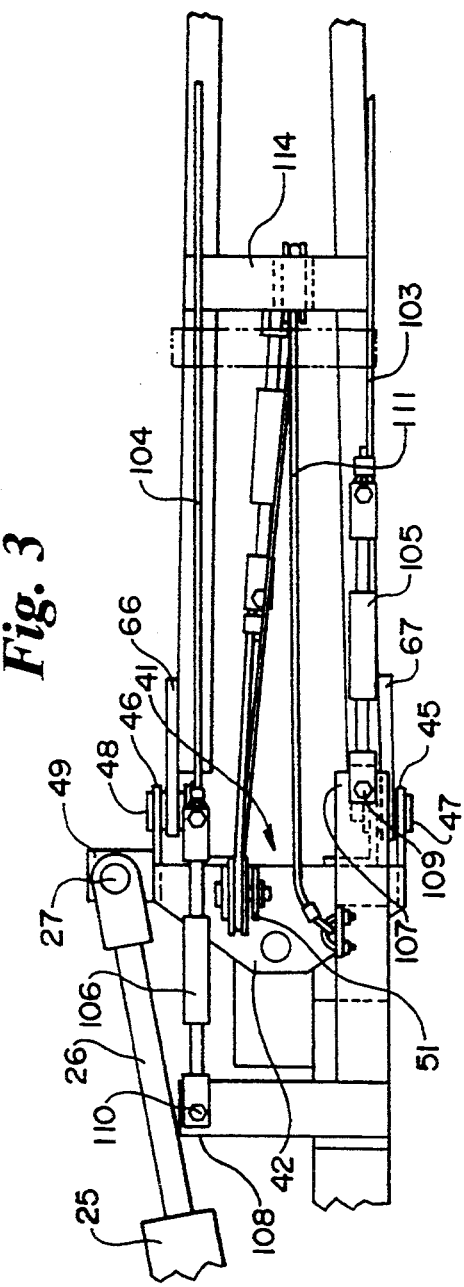
FIG. 3 is a detail, at enlarged scale, in top view of the hinge mechanism of the marker of FIG. 1.

Referring now to FIGS. 1 and 2, the marker according to the present invention is shown in FIGS. 1 and 2 in the extended or working position. Reference number 1 generally refers to a portion of the outer lateral edge of an implement, such as a planter, to which the marker of the present invention may be attached. Only a portion of the implement is shown in FIG. 1. Also as seen in FIGS. 1 and 2, the marker of the present invention includes a mounting frame portion generally indicated by reference number 2, a pivot mechanism generally indicated by reference number 4, and an inner arm member generally indicated by reference number 6, an outer arm portion generally indicated by reference number 8.

As is generally known in the art, the implement has a frame, only the lateral edge of which is shown in the figures. Specifically, a semi-rectangular portion is shown, consisting of rear beam 12, end beam 11, and front beam 13, which are suitably attached together and form the outer edge of the implement.

The mounting frame 2 of the marker includes a frame member 21 and a pair of supports 22, 23, all of which may be made out of square-sectioned tubular steel stock. The supports 22, 23 include mounting flanges for bolting or otherwise securing to the front beam 13 of the implement. Frame member 21 is secured, as by welding, to supports 22 and 23 to position it generally horizontally (with the implement in its working position) and spaced slightly above the frame of the implement.

The pivot mechanism 4 includes a pivot member 41, so-called because it is pivotally connected to the mounting frame 2, and the inner arm 6 of the marker in turn is pivotally connected to pivot member 41. Specifically, pivot member 41 includes an upper plate 42 and a lower plate 43 which are arranged to fit on either side of an end of frame member 21, where they are pivotally secured by a pivot pin 44, which can be in the form of a bolt and bushing, as is generally known. Upper plate 42, lower plate 43, and the end of frame member 21 all have holes formed therein in alignment to receive pivot pin 44, whereby pivot member 41 can rotate as part of the marker folding process, explained below.

Pivot member 41 also includes arm mounting brackets at either end thereof, indicated by reference numbers 45, 46. These brackets, which may incorporate with another internal bracket as shown in dotted line in FIG. 3, receive pivot pins 47, 48 and pivotally mount the inner arm 6, specifically pivot plates 66, 67 of the inner arm. These pivots provide for a ground contour- following motion, as will be described, when the marker is in its use position.

Pivot member 41 also includes a tab portion 49 secured to one side thereof on the end thereof and toward the center portion of the arm bracket 46. Tab 49 has a hole to receive pivot pin 27 through the end of movable rod 26 of hydraulic cylinder 25. The other end of hydraulic cylinder 25 is pivotally attached to a mounting tab 28 on frame member 21.

Pivot member 41 also has secured thereto a pulley bracket 51 for mounting one of the pulleys of the cable control system, explained below.

Inner arm 6 is made up of a pair of elongate tubular steel members 61, 62, connected by a plurality of angle iron struts 63 welded between them. One or more reinforcing tubes such as tube 64 may be attached to form a bridge-like reinforcing structure to provide the needed degree of stiffness, according to the weight and length of the marker. Tubular members 61, 62 have pivot plates 67, 66 welded thereto, for attachment to the pivots and pivot pins 48, 47, as previously described.

Inner arm 6 narrows toward its outer end, with tubular members 61 and 62 being spaced closer together at that end, where they are attached to an outer pivot 70 which mounts outer arm 8 for folding motion, as is described below.

Outer arm 8 is also preferably comprised of tubular steel members 81, 82, connected together by welded angle iron struts 83. Outer arm 8 also narrows from its widest point at the inner end where tubular members 81, 82 are attached to outer pivots 70 by pivot pin 118, to a narrower width at the outer end where tubular members 81, 82 are attached by brackets 84. These brackets also support a shaft 86 which holds marker disc 88 perpendicular thereto, so that it will form the marked groove or scores in the ground 200 in the use position, for example as seen in FIG. 2.

The inner arm 6 also includes a caster wheel 73, mounted on mounting brackets 74 which are pivotally attached to the outer end of inner arm 6, to partially support the weight thereof in the use position.

FIGS. 1 and 2 show the marker in the use or field position, attached to the outer edge of an implement, with caster wheel 73 supporting a portion of the weight of inner arm 6, and with outer arm 8 resting on marker disc 88, which forms the marker furrow in the ground 200 parallel to the direction of travel of the implement. It will be appreciated that due to the pivotal connections of the outer and inner arms at pivot 47-48 and pivot 70, the arm is free to follow variations or contours in the ground to keep marker disc 88 engaging the ground 200, and without applying excessive tilting forces to the implement.

In the folded or transport position, outer arm 8 folds up and over approximately 180° to lie on top of inner arm 6, as suggested by direction arrow 90, FIG. 2. Simultaneously, inner arm 6 rotates about a vertical axis approximately 90°, as suggested by direction arrow 91, FIG. 1, to lie alongside or slightly above end beam 11, with caster wheels 73 lifted off the ground 200. This folded position is shown in FIG. 5.

The folding and unfolding process is powered by hydraulic cylinder 25, controlled by the usual type of hydraulic controls (not shown) under the control of the implement operator. The folding and unfolding in turn is effected by a control system, consisting in the preferred embodiment of a plurality of control cables.

A pair of pulleys 101, 102 are attached to the inner end of outer arm 8, coaxially with outer pivot 70. These pulleys are not free-mounted, but are attached to outer arm 8 so that when pulleys 101, 102 are moved, they cause outer arm 8 to pivot about outer pivot 70. A control cable 103 extends from a pivot mechanism 4 outwardly along inner arm 6 and passes over the top of and around pulley 101, then is secured thereto by a pin 103A or other suitable connection means. Similarly, a control cable 104 extends from pivot mechanism 4 generally outwardly along inner arm 6 to pass under and around pulley 102, where it is affixed by a pin or other suitable means (not shown). Cables 103 and 104 are used for folding and unfolding the outer arm.

Control cable 103 attaches via a turnbuckle 105 to a bracket portion 107 extending from and attached to steel stock 119, which is preferably attached to frame member 21 by welding.

Control cable 104 similarly connects through turnbuckle 106 to a bracket 108 attached to frame member 21. Thus, as seen in FIG. 3, both cables 103 and 104 are attached to the marker frame, but are offset from each other in opposite directions from the location of pivot pin 44.

Figure 4:
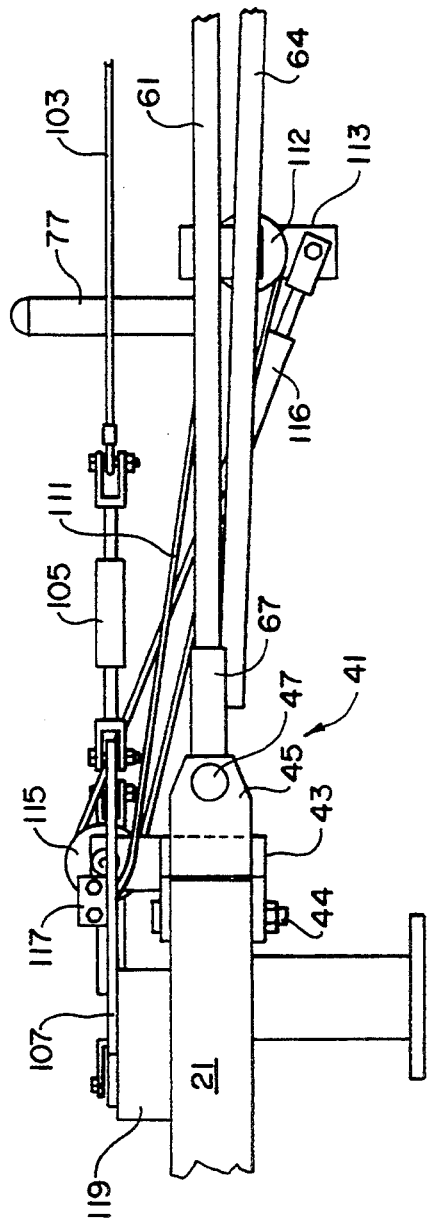
FIG. 4 is a detail view, in side view, at enlarged scale corresponding to FIG. 3.

A third control cable 111 is provided for lifting the inner arm. A pulley 112 is mounted on suitable mounting brackets 113 attached to a cross brace 114 which is attached to tubular members 61, 62, generally adjacent but spaced apart from the inner end of the inner arm 6. A pulley 115 is mounted on brackets 51 of the pivot member 41. Control cable 111 attaches, via turnbuckle 116, to a lower extension of mounting bracket 113 at one end. Cable, 111 then extends over and around pulley 115 and back under and around pulley 112 to an anchor 117 mounted in bracket 107, as seen in FIGS. 3 and 4.

The folding/unfolding operation will now be described. Starting with the marker in its use position as seen in FIGS. 1 and 2, the folding operation starts with hydraulic cylinder 25 retracting its control rod 26 which applies a pivoting force to pivot member 41, and starts the entire marker arm to pivot about the vertical axis of pivot pin 44 along path 91 toward end beam 11. As this motion takes place, the distance between attachment 109 and pulley 101 increases, causing cable 103 to rotate pulley 101 and start to raise outer arm 8. When outer arm 8 has moved up to 90°, it would tend to fall forward over the top down toward inner arm 6, but at that point it is restrained by cable 104. As the folding progresses, the distance between attachment 110 and pulley 102 decreases, which allows cable 104 to gradually lower arm 8 on down to its storage position, resting on support 77 which is attached to inner arm 6 at an appropriate point to support shaft 86 of the outer arm.

As folding continues, the distance between attachment anchor 117 and mounting bracket 113 lengthens, putting cable 111 in tension. This cable was previously adjusted with sufficient slack so that it preferably does not begin to tension until the rotation of lower arm 6 about pivot pin 44 is approximately 75% complete. At that point, increasing tension in cable 111, acting through the block and tackle arrangement of pulleys 112, 115, applies a lifting force to the inner arm, causing it to pivot upward slightly about pivots 47, 48, bring the caster wheel 73 off the ground 200, and moving the arm into place on the stabilization bracket 30. Stabilization bracket 30 is attached by suitable bolts to position on end beam 11 of implement 10, to receive and support the marker in the fold-up position, as indicated in FIG. 5.

Stabilization bracket 30 includes-an upright portion 31 and a curved lower shelf portion 37. The bracket is hinged to a base portion thereof by a limited hinge 33. Hinge 33 can pivot through a limited arc, and is preferably spring-loaded so as to be in an out position, leaning away from end beam 11, when the marker is in its use position. During the last stage of the folding process, the marker comes into contact with upright 31, moving it inward through its arc, slightly over center to a rest position where the curved lower shelf portion 37 holds and supports the marker.

Although stabilization bracket 30 will support the arm in the folded position prior to folding of the planter implement, it will not necessarily support it as the outer end of the implement is itself folded to a vertical position, then to a further folding to a horizontal position, in the case of a doubly-articulated planter implement, which would result in inverting the marker from the position shown in FIG. 5, in such folded position of the implement. In that situation, the weight of the marker, and the fact that the inner end is pivotally connected at 47, 48, and the fact that there is a certain amount of play or slack in the control cables, would mean that the marker could sag down slightly, which might result in its interference with other parts. To prevent this, retainer chains should be attached from stabilization bracket 30, around the folded marker, to prevent unwanted movement prior to folding of the planter implement.

To unfold the marker from the position shown in FIG. 5, after first removing retaining chains previously mentioned, a hydraulic cylinder 25 is actuated to extend its control rod 26. This starts the unfolding pivoting of the inner arm about pivot pin 44, eventually to move in a 90° angle to the use position. As it begins to move, cable 111 begins to release its tension, due to the, location of its end points which will move closer together during the unfolding process. This allows the inner arm to come down to where caster wheel 73 engages the ground 200 and begins to support the weight of the marker.

Also as the unfolding proceeds, the distance between attachment 110 and pulley 102 increases, causing cable 104 to begin to lift and unfold outer arm 8. When it reaches the vertical position, it is prevented from falling outwardly and downwardly by cable 103, which lowers it to the working position as the unfolding and pivoting around pivot pin 44 is completed.

It will be appreciated that the turnbuckles for the control cables must be adjusted to provide the correct amount of slack or play so as not to prevent the normal small up and down movements of the marker arm in following ground contours. It will also be appreciated that during the folding operation, the weight of outer arm 8, being supported and lowered by cable 104, actually serves to help lift the lower arm, due to the location of attachment 110 above the pivot axis 47–48. This is advantageous, as it reduces the amount of lifting force that must be supplied by cable 111.

It will be understood by those skilled in the art that the present inventions are not limited to the examples discussed above, but may be changed or modified without departing from the spirit or scope of the invention.

What is claimed is:

1. A folding marker attachable to an agricultural inclement for scoring the ground adjacent to the implement, comprising:
    an inner arm having first and second ends pivotally attached at the first end to the agricultural implement;
    an outer arm having first and second ends, the first end of the outer arm pivotally attached to the second end of the inner arm for movement in a generally vertical direction;
    a marker device attached to the second end of the outer arm for scoring the ground;
    an actuator for moving the inner arm between a use position and a transport position;
    a first pulley system pivoting the outer arm vertically upward as the actuator moves the inner arm toward the transport position; and
    a second pulley system pivoting the inner arm vertically upward as the actuator moves the inner arm toward the transport position.

2. The apparatus of claim 1 wherein the first pulley system lowers the outer arm downward toward the ground as the actuator moves the inner arm from the transport position to the use position.

3. The apparatus of claim 1 wherein the second pulley system lowers the inner arm downward toward the ground as the actuator moves the inner arm from the transport position to the use position.

4. The apparatus of claim 1 wherein the second pulley system permits the actuator to move the inner arm part of the distance between the use position and the transport position before the inner arm begins to pivot vertically upward so that the folding marker is supported by a support wheel during a portion of the folding operation.

5. The apparatus of claim 1 wherein movement of the inner arm from the use position to the transport position comprises movement of the inner arm about horizonal and vertical axes, backwards toward the rear of the implement.

6. A method for operating a folding marker attached to an agricultural implement for scoring the ground adjacent to the implement, comprising the steps of:

providing an inner arm having first and second ends pivotally attached at the first end to the agricultural implement, an outer arm having first and second ends, the first end of the outer arm pivotally attached to the second end of the inner arm for movement in a generally vertical direction, and a marker device attached to the second end of the outer arm for scoring the ground;

moving the inner arm between a use position and a transport position;

activating a first pulley system for pivoting the outer arm vertically upward as the actuator moves the inner arm toward the transport position; and activating a second pulley system for pivoting the inner area vertically upward as the actuator moves the inner arm toward the transport position.

7. A folding marker that is attachable to an agricultural implement for scoring the ground adjacent to the implement, the folding marker being self-supporting while in a use position and during a portion of a folding operation, comprising:

an inner arm having first and second ends pivotally attached at the first end to the agricultural implement for simultaneous movement about horizonal and vertical axes;

an outer arm being pivotally attached to the second end of the inner arm for movement in a generally vertical direction;

a caster wheel attached to the second end of the inner arm to support the inner and outer arms while the folding marker is in the use position;

a marker device attached to the second end of the outer arm for scoring the ground;

actuator means for moving the inner arm between the use position and backwards toward the rear of the implement to a transport and storage position;

first pulley means for pivoting the outer arm vertically upward as the actuator means moves the inner arm toward the transport position; and second pulley means for pivoting the inner arm vertically upward as the actuator means the inner arm toward the transport position.

8. The apparatus of claim 7 wherein the first pulley means lowers the outer arm downward toward the ground as the actuator means moves the inner arm from the transport position to the use position.

9. The apparatus of claim 7 wherein the second pulley means lowers the inner arm vertically downward toward the ground as the actuator means moves the inner arm from the transport position to the use position.

10. The apparatus of claim 7 wherein the second pulley means permits the actuator means to move the inner arm part of the distance between the use position and the transport position before the inner arm begins to pivot vertically upward so that the folding marker is supported by the caster wheel during a portion of the folding operation.

11. A folding marker that is attachable to an agricultural implement for scoring the ground adjacent to the implement, the folding marker being self-supporting while in a use position and during a portion of a folding operation, comprising:

an inner arm having a front and back portions and first and second ends, the first end being pivotally attached to the agricultural implement at an inner pivot point for simultaneous movement about horizonal and vertical axes;

an outer arm having a first and second end, the first end of the outer arm being pivotally attached to the second end of the inner arm at a second pivot point for movement in a generally vertical direction;

a caster wheel attached to the second end of the inner arm to support the inner and outer arms while the folding marker is in the use position;

a marker device attached to the second end of the outer arm for scoring the ground;

an actuator attached to the implement at a first end and the back portion of the inner arm at a second end for moving the inner arm between the use position and backwards toward the rear of the implement to a transport and storage position;

a first pulley system attached at a first end to the implement proximate the inner pivot point and the front portion of the inner arm, and at a second end coaxially with the second pivot point so that the outer arm pivots vertically upward as the actuator moves the inner arm toward the transport position; and a second pulley system attached at a first end to the implement proximate the front portion of the inner arm and the first pivot point, and at a second end to the inner arm so that the inner arm pivots vertically upward as the actuator moves the inner arm toward the transport position.

12. The apparatus of claim 11 wherein the first pulley system lowers the outer arm downward toward the ground as the actuator moves the inner arm from the transport position to the use position.

13. The apparatus of claim 11 wherein the second pulley system lowers the inner arm vertically downward toward the ground as the actuator moves the inner arm from the transport position to the use position.

14. The apparatus of claim 11 wherein the second pulley system includes an adjustable block and tackle mechanism that permits the actuator to move the inner arm part of the distance between the use position and the transport position before the inner arm begins to pivot vertically upward so that the folding marker is supported by the caster wheel during a portion of the folding operation.

15. The apparatus of claim 14 wherein the actuator moves the inner arm 75% of the distance between the use position and the transport position before the inner arm begins to pivot vertically upward so that the folding marker is supported by the caster wheel during that portion of the folding operation.

16. The apparatus of claim 11 further including a third pulley system attached at a first end to the implement proximate the inner pivot point and the rear portion of the inner arm, and at a second end coaxially with the second pivot point so that the third pulley system lowers the outer arm to a folded position on the inner arm as the actuator moves the inner arm from the use position to the transport position.

17. The apparatus of claim 11 wherein the folding marker is fully supported by the implement when in the transport and storage position.

18. The apparatus of claim 11 wherein a folding marker is attached to each side of the agricultural implement for scoring the ground adjacent to either side of the implement.

19. A method for operating a folding marker that is attachable to an agricultural implement for scoring the ground adjacent to the implement, the folding marker being self-supporting while in a use position and during a portion of a folding operation, comprising the steps of:

a) providing an inner arm having a front and back portions and first and second ends, the first end being pivotally attached to the agricultural implement at an inner pivot point for simultaneous movement in both the horizonal and vertical directions, a caster wheel attached to the second end of the inner arm to support the inner arm while the marker is in the use position, an outer arm having a first and second end, the first end of the outer arm being pivotally attached to the second end of the inner arm at a second pivot point for movement in a generally vertical direction, a marker device attached to the second end of the outer arm for scoring the ground, an actuator attached to the implement at a first end and the back portion of the inner arm at a second end, a first pulley system attached at a first end to the implement proximate the inner pivot point and the front portion of the inner arm, and at a second end coaxially with the second pivot point, and a second pulley system attached at a first end to the implement proximate the front portion of the inner arm and the first pivot point, and at a second end to the inner arm;

b) actuating the actuator to move the inner arm backwards toward the rear of the implement from the use position to a transport and storage position so that the inner arm and the outer arm pivot vertically upward toward a folded position.

20. The method of claim 19 wherein the actuator moves the inner arm part way between the use position and the transport position before the inner arm begins to pivot vertically upward so that the folding marker is supported by the caster wheel during a portion of the folding operation.

21. The method of claim 19 wherein activating the actuator to move the inner arm from the transport position to the use position causes the inner and outer arms to be lowered toward the ground so that the folding marker is in the use position.

22. The method of claim 19 further including the steps of:

c) providing a third pulley system attached at a first end to the implement proximate the inner pivot point and the rear portion of the inner arm, and at a second end coaxially with the second pivot point so that the third pulley system moves the outer arm from the folded position as the actuator moves the inner arm from the transport position to the use position.

* * * * *